United States Patent

Harris et al.

[11] Patent Number: 5,613,742
[45] Date of Patent: Mar. 25, 1997

[54] ASYNCHRONOUS REAR DUMP LOGIC IN ABS CONTROL SYSTEMS

[75] Inventors: Alan L. Harris, Balsall Common; Mark I. Phillips, Yardley, both of England

[73] Assignee: Lucas Industries public limited company, Solihull, England

[21] Appl. No.: 380,695

[22] Filed: Jan. 30, 1995

[30] Foreign Application Priority Data

Feb. 1, 1994 [GB] United Kingdom .................. 9401830

[51] Int. Cl.⁶ .................................................. B60T 8/00
[52] U.S. Cl. .................................... 303/157; 303/170
[58] Field of Search ........................ 303/113.1, 115.2, 303/119.1, 170, 187, DIG. 6, 156, 157; 364/426.02

[56] References Cited

FOREIGN PATENT DOCUMENTS

| 0088894 | 9/1983 | European Pat. Off. . |
| 0202845B1 | 11/1986 | European Pat. Off. . |
| 0307588 | 3/1989 | European Pat. Off. . |
| 0435114 | 7/1991 | European Pat. Off. . |
| 1243523 | 8/1971 | United Kingdom . |
| WO91/05687 | 5/1991 | WIPO . |
| WO92/20555 | 11/1992 | WIPO . |

*Primary Examiner*—Josie Ballato
*Attorney, Agent, or Firm*—Oblon, Spivak, McClelland, Maier & Neustadt, P.C.

[57] ABSTRACT

An anti-lock ABS braking system for a road vehicle includes a respective dump valve for each brake actuator which enables pressure to be selectively dumped from that actuator to release the braking action of the relevant rear wheel. Whether a given rear wheel of the vehicle is still operating in a stable condition is established, as is the aggregate dump valve time of the rear wheel opposite to that under consideration. The brake pressure at the still stable rear wheel is allowed to continue to rise for a prescribed period and then its dump valve is actuated for a period corresponding to the measured aggregate dump time of the opposite rear wheel.

1 Claim, 5 Drawing Sheets

ASYNCHRONOUS REAR DUMP LOGIC IN ABS CONTROL SYSTEMS

BACKGROUND OF THE INVENTION

The present invention relates to anti-lock (ABS) braking systems for road vehicles and is concerned in particular with the so-called select-low logic of ABS rear axle control.

It will be helpful to the understanding of the following discussion of the present invention to identify and distinguish between the two basic types of control systems conventionally used to control the supply of pressurised fluid to the brake actuator(s) of the braking system. The first type is normally referred to a solenoid/solenoid or Two Solenoid per channel and the other type is normally referred to as the Flow-Valve type. The basic construction and function of these two systems is now described.

In a Solenoid/Solenoid or Two Solenoid per Channel system two solenoids control two fluidic valves adapted to control firstly the communication between the pressure source (master cylinder) and a brake actuator, and secondly, the communication between that brake actuator and a low pressure reservoir (tank or expander) which usually forms the inlet to a return pump adapted to supply fluid under pressure to the pressure source. The first valve is commonly known as the inlet valve, the second valve thus being the outlet or as more commonly known, dump valve. The inlet valve has two main functions, (1) to block communication between the pressure source and the brake actuator when the brake pressure is being reduced by the dump valve, and (2) to control the rate at which the brake pressure is reapplied to the brake actuator during the apply phase by control of the solenoid pulse rate. An early example of this type of control system can be found in GB-A-1 243 523.

On the other hand, in a Flow-Valve system the inlet valve of the above described Solenoid/Solenoid system is replaced by a spool valve controlled by the presence of a pressure differential across it. The control functions it performs are substantially identical to that of the solenoid controlled inlet valve above, i.e. blocking of the inlet connection and application rate control, except that the flow valve is arranged to provide substantially a constant flow rate, i.e. fixed reapplication rate. Variation in this rate can be achieved by pulsing of the dump valve, but for the majority of operational conditions the tuned fixed rate is satisfactory. An example of this type of control system can be found in our EP-A-202845.

One major difference with respect to the reapplication flow rate is that the flow valve rate is substantially independent of the applied pressure of the source, whereas in the 2 solenoid per channel system for a given inlet solenoid pulse rate, the actual reapplication flow rate will vary in accordance with the applied pressure of the source. Usually the ABS system has no knowledge of the applied pressure of the source and therefore the only system that can reliably produce a desired reapplication rate is the flow valve system.

Most passenger car ABS are arranged to provide independent control of the brake pressure applied to each front wheel, but Select-Low control of the rear axle. Select-Low control entails controlling the brake pressure to both rear wheels with identical solenoid firings based on the behaviour of whichever one of the pair has the greatest tendency to skid. The objective is to maintain pressure equilibrium across the axle. Independent control of all four wheels would provide optimum deceleration, but inadequate stability during manoeuvres, and on split μ surface, that is where one wheel of a given axle is running on a high μ surface such as a dry road and the other wheel of that axle is running on a relatively low μ surface such as ice.

Trucks often have individual control of each wheel, or group of wheels, but are inherently more stable because of their longer wheelbase. Some trucks have Select-Low control at the front axle in order to reduce steering kickback caused by the use of steering geometry with a large ground-offset; it is also known to change gradually from Select-Low to independent control so that stopping distance can be reduced.

In the context of a 2-Solenoid per Channel system, a Quasi-Select-Low logic has already been proposed for the rear axle, whereby the Select-Low pressure dump firings for a still-stable rear wheel are delayed until either the opposite wheel regains stability, or a fixed maximum period has elapsed. Immediate solenoid firing is permitted if the wheel becomes unstable during the delay period.

The principal objective in the latter system was to improve the pedal feedback by staggering the scavenging of the dumped brake-displacement volume. During the delay period, the brake pressure for that wheel is held constant, provided that the wheel remains stable. At the end of the delay period the dump solenoid of the stable rear wheel is fired for a period corresponding to the aggregate dump time of the unstable rear wheel, so as to re-establish pressure equilibrium across the axle. The brake pressure at both wheels is then increased synchronously until the next skid cycle occurs.

A secondary objective of the known Quasi-Select-Low system is to reduce stopping distance on non-homogeneous surfaces, but this aim is compromised to some extent by the need to achieve pressure equilibrium before commencing the reapply process.

Using the brake pressure hold facility of the latter known system, it would have been attractive to maintain constant pressure at the still-stable wheel throughout the modulation of pressure at the unstable wheel, and then to calculate the number of reapply pulses needed after the pressure dump in order to reestablish the original pressure level. Unfortunately, this is not practicable in a Two-Solenoid per Channel system because the magnitude of each reapply pulse depends upon the pressure level in the pressure source or master-cylinder, which can vary unpredictably during the course of the stop.

Thus, in a Two-Solenoid per Channel system, calculation of the number of re-apply pulses needed at the controlled, low-mu wheel to bring its pressure approximately back to that of the co-controlled, higher-mu wheel is extremely difficult and in practice cannot be easily achieved, due to the number of variables controlling fluid flow within the system.

The known Quasi-Select-Low logic works in that the dump time needed to bring the co-controlled wheel's pressure down to that of the controlled wheel is relatively straight forward to calculate because they both started from the same brake pressure; the subsequent re-apply phases can then be kept in synchronism by the use of identical hold-value pulse widths because they are both supplied by the same master-cylinder pressure, albeit from separate circuits. However, potentially-useful brake force at the still-stable wheel has to be surrendered whilst its brake pressure is first dumped to a relatively low level, then increased at a cautiously slow rate.

When considering how to achieve the same objectives within the context of a Flow-Valve system, the prior art predicts only problems, not solutions. The hold facility is crucial to the prior-art logic, both whilst sustaining the pressure at the still-stable wheel during the delay period, and whilst maintaining the final dump pressure in the previously-unstable wheel until the opposite wheel has been dumped to that new equilibrium level.

It is possible to maintain the pressure level of a flow-valve system within quite a narrow range by pulsing the dump solenoid, but only when the appropriate mark-to-space ratio is known, or can be found by observation. Because the required mark-to-space ratio will vary considerably with brake pressure, which the system could only estimate with considerable approximation, the accuracy of the quasihold is inadequate for this purpose.

If the pressure at the still-stable wheel cannot be held constant, then it will continue to rise during the delay period, and this raises concerns about potential impairment of vehicle stability and how to calculate the extra dump-time needed to compensate for the unwelcome additional pressure. These are the questions raised by analysis of the prior art for which no solution has until now be proposed.

SUMMARY OF THE INVENTION

It is an object of the present invention to provide a solution to these problems in the context of a flow valve system, but possibly also in a still further control system type using a fixed or known reapply rate.

In accordance with the present invention, the brake pressure at a still stable rear wheel is allowed to continue to rise for a prescribed period, after which period its dump solenoid/valve is fired for a period corresponding to the aggregate dump time of the opposite rear wheel.

Said "prescribed" period can be a predetermined period which could either be fixed or made dependent upon one or more vehicle parameters.

Means can be provided for equating this operation to a parallelogram of dump and application times. By this technique, the average pressure across an axle can be maintained at substantially the same level throughout a given stop whilst allowing partial separation in pressure across the axle.

This gives improved utilisation at the rear by holding onto at least one wheels pressure during the dump phase of the controlled wheel and results in the inherent stability embodied within pure select low systems with the improved utilisation of maintaining pressure within the co-controlled wheel.

BRIEF DESCRIPTION OF THE DRAWINGS

The invention is described further hereinafter, by way of example only, with reference to the accompanying drawings, in which.

DETAILED DESCRIPTION OF PREFERRED EMBODIMENTS

Figure 1:
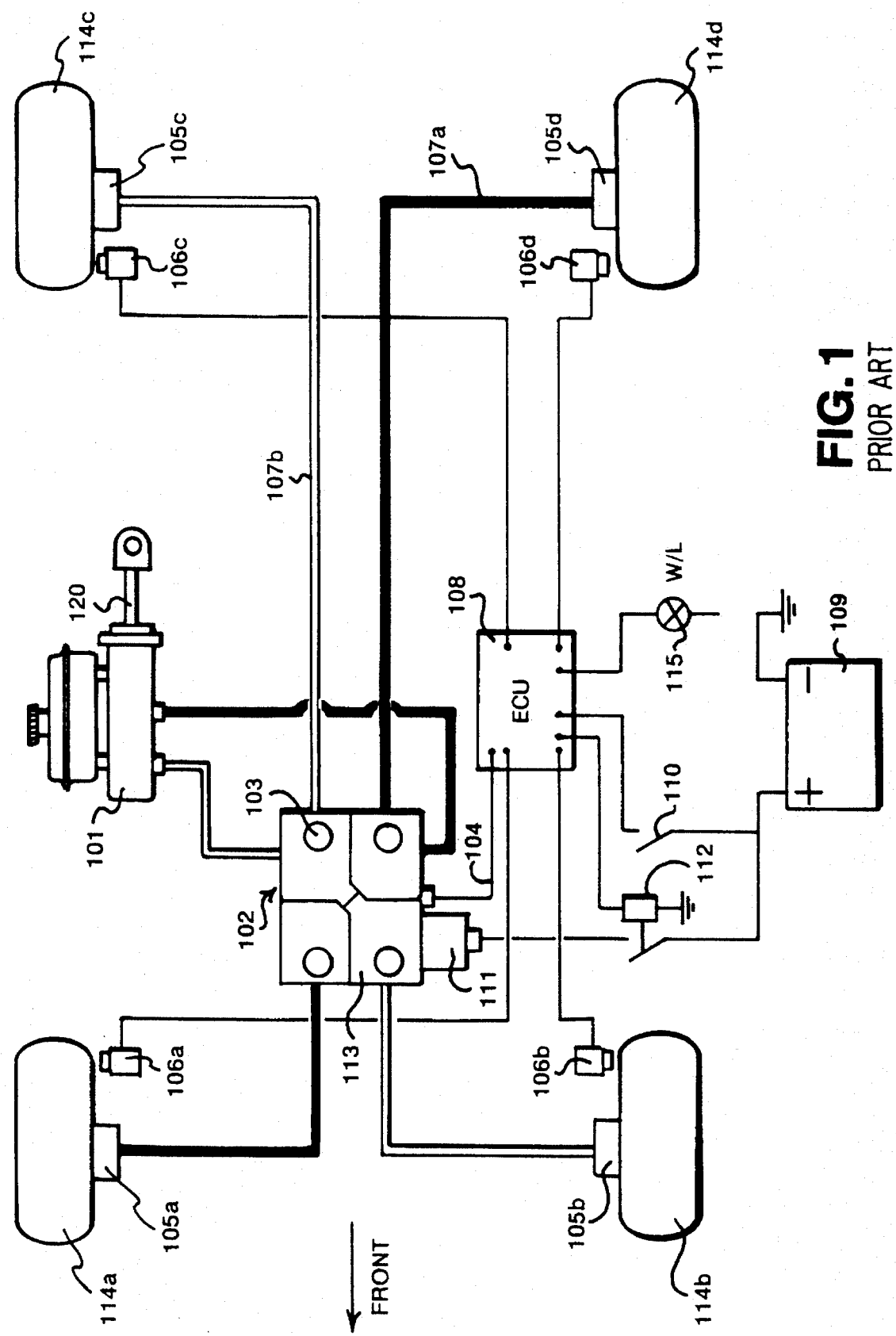
FIG. 1 is a schematic diagram of the basic hydraulic and electrical arrangement of a typical vehicle to which the present invention can be applied.

Referring first to FIG. 1, there is illustrated highly schematically the braking system for a vehicle having four wheels 114, two at the front 114a 114b and two at the rear 114c, 114d. The system is of the X-split type having independent hydraulic circuits, with the first circuit 107a (black) actuating the front offside and rear nearside wheel brakes 105a 105d and the second circuit 107b actuating the front rearside and rear offside wheel brakes 105b, 105c. A brake pedal (not shown) is mechanically connected to the actuating plunger 120 of a dual circuit master cylinder 101. The master cylinder 101 is connected to a modulator 102 comprising a plurality of control channels 113 having control valves 103 and flow rate control means (not shown), connected to an electronic control unit (ECU) 108 by control lines 104, the control valves 103 being adapted to control the communication between the brake 105 and an internal expander or reservoir. Rotational speed of each wheel 114 is sensed individually by wheel speed sensors 106a–106d connected to the ECU 108 which is adapted to control the control valves 103 of the modulator 102 in dependence upon signals received from the wheel speed sensors 106.

The ECU 108 is powered from a battery/alternator circuit 109 of the vehicle via an ignition switch 110. The battery/alternator circuit 109 also supplies power to modulator pump motor 111 via a relay valve 112 controlled from signals generated by the ECU 108. Should the ECU 108 determine that an appropriate fault has occurred then a fault warning indicator (warning lamp) 115 is activated.

Figure 2:
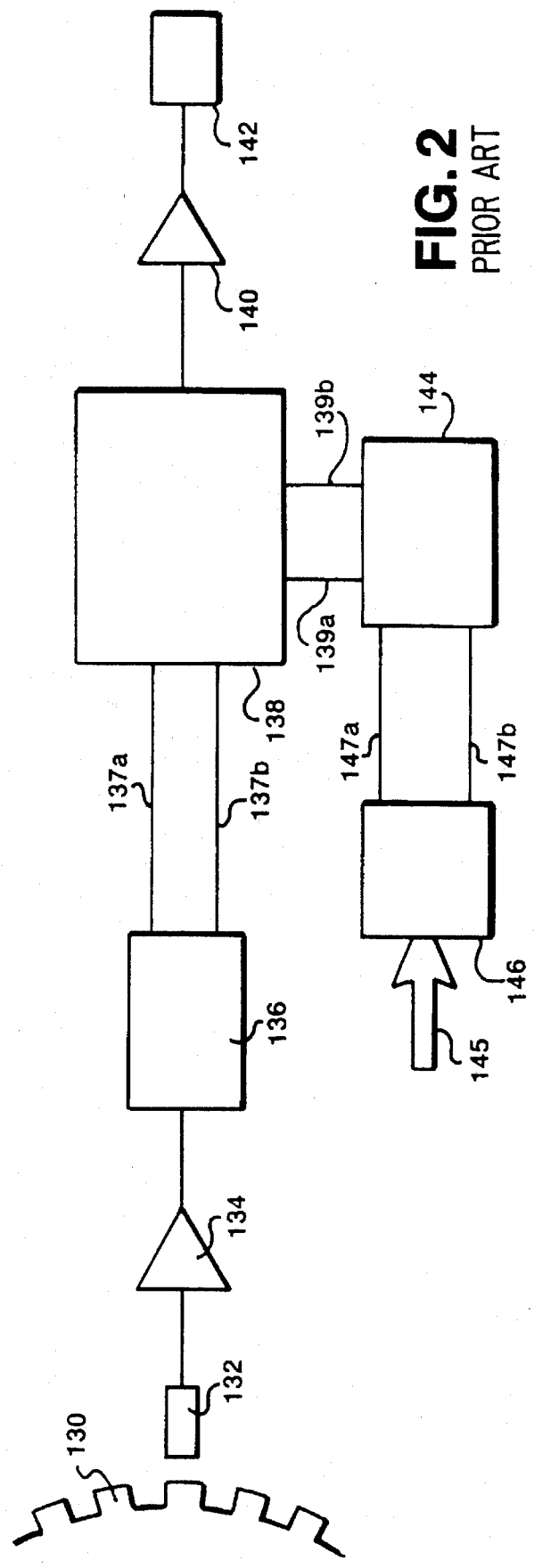
FIG. 2 is a schematic diagram illustrating the basic ABS function of the braking system.

Referring now to FIG. 2, there is illustrated a typical overall ABS electronic system layout. Each vehicle wheel carries a respective exciter 130 whose rotation is detected by a sensor 132. The sensor signal, after signal conditioning at 134, is passed to a wheel speed and wheel deceleration calculating means 136 which establishes a wheel speed signal and a wheel acceleration/deceleration signal on lines 137a, 137b, respectively. The latter signals are passed to a computer 138 for calculating the relevant ABS functions. A plurality of wheel speed signals are also input at 145 to a vehicle speed and deceleration estimation means 146 which establishes a vehicle speed signal and a vehicle deceleration signal on lines 147a and 147b, respectively. The latter signals are fed to a skid detection threshold calculating means 144 which provides to the computer 138 a slip threshold signal and a deceleration threshold signal on lines 139a and 139b respectively. The computer uses the various signals to control the operation of a dump solenoid 142 via signal conditioning means 140.

Figure 3:
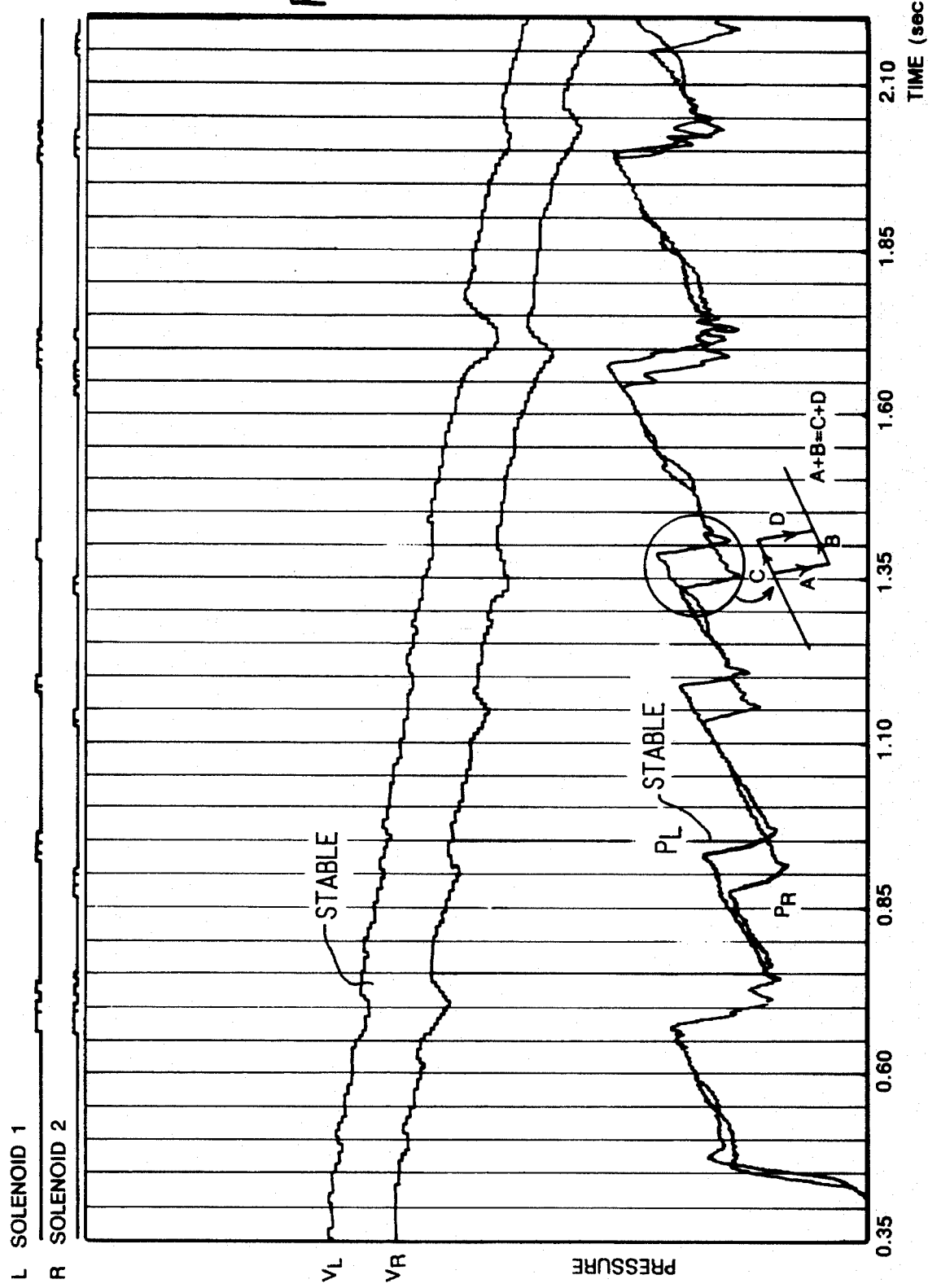
FIG. 3 is a diagrammatic illustration of the operation of an ABS system having a flow valve control system and asynchronous rear dump logic in accordance with the present invention.

Referring now to FIG. 3, the top two lines (L,R) identify the operation of the dump solenoids for the brake actuators at two opposite ends of a given axle, the middle two curves ($V_L V_R$) show the respective wheel speeds of the wheels controlled by the two brake actuators and the bottom two curves ($P_L$, $P_R$) show the respective actuation pressures for the two actuators.

The solution provided by the present invention to the problems described hereinbefore stems from the recognition that, for a flow-valve system, the ratio of the dump rate to the re-apply rate is fairly constant, if one considers only a relatively narrow range of pressures. Fortunately, the range of pressure necessary to control a rear wheel on any given surface is acceptably narrow, although the magnitude of the pressures involved will depend upon the adhesion of that given surface. Thus on a high μ surface the pressure may vary between, say, 45 bar and 70 bar, whilst the corresponding figures for low μ might be 5 bar and 30 bar. The significance of the constant ratio is that the same change can be accomplished by the same combination of dump and reapply periods applied in either chronological sequence. Thus a dump of 20 ms followed by a rise of 100 ms will produce the same overall change as a 100 ms rise followed by a 20 ms dump.

Thus, in a system in accordance with the present invention, the brake pressure at the still-stable rear wheel is allowed to continue rising for a prescribed period, after which period its dump solenoid is fired for a period corresponding to the aggregate dump time of the opposite rear wheel.

Since the aggregate dump/reapply time for the controlled wheel has been found to equate closely to the aggregate application/dump time of the co-controlled wheel, for a given period within a skid cycle, this can easily be equated to a parallelogram of dump and application times, as indicated by reference to the pressure curves indicated in FIG. 3. Therefore, the average pressure across an axle can be maintained at substantially the same level throughout a given stop whilst allowing partial separation in pressure across the axle, giving improved pedal feedback and utilisation at the rear by holding onto at least the co-controlled wheel's pressure during the dump phase of the controlled wheel. This gives the inherent stability embodied within pure select low systems with the improved utilisation of maintaining pressure within the co-controlled wheel, and improved driver comfort as the actions on the rear axle are blended and balanced, thus reducing axle oscillations.

This is an unexpected result. The teaching of the prior art is that a merely equivalent dump time would be insufficient to achieve pressure equilibrium, because the initial pressure would have been higher than the skid-pressure of the unstable wheel by an amount corresponding to the rise-rate and the delay period. The reason why the use of an equivalent dump time is correct is that, in the absence of a hold facility at the end of the unstable wheel's dump phase, the pressure at that wheel begins to rise immediately, and the extent of this pressure rise closely matches the "unwanted" rise which occurred in the stable wheel.

Of course, normal dump action is still permitted without impairment in the event of the stable wheel becoming unstable during the delay period. Under these circumstances pressure equilibrium is re-established by ensuring that the aggregate dump times of the two wheels are balanced.

If the ratio of rise-rate to dump rate was not the same for both wheels then the desired pressure equilibrium would not be achieved.

Using the present logic, the pressure equilibrium occurs not at the end of the unstable-wheel dump, but part-way through the unstable-wheel's reapply phase. Thus the amount of discarded but potentially-useful adhesion is reduced and, when the effect of the pressure rise during the delay period is also considered, a more worthwhile improvement in efficiency can be achieved than is possible with the known Quasi-select-Low logic described hereinbefore.

Tests with the new logic on a snow surface have indicated benefits compared with a conventional Select-Low logic. Vehicle deceleration is also smoother than with normal Select-Low because the occurrence of tire/road braking-force peaks and troughs becomes more randomly distributed.

The stability risks have been overcome by selecting different delay periods according to the vehicle deceleration and speed. On very low μ surfaces (e.g. $\mu \leq 0.15$) a delay is only allowed at low speeds (e.g. <15 Km/h), and is restricted to a relatively short period (e.g. 50 ms). A longer delay (e.g. 75 ms) can be allowed on higher μ surfaces, but it may be restricted to a shorter period at higher speeds. Also, the Asynchronous Select Low logic is not allowed to work during the first cycle.

A further distinction from the known Quasi-Select Low logic is that the flow-valve logic has no need to begin the dump of the stable wheel as soon as the unstable wheel is ready to begin the reapply phase. In the known system this avoids holding the pressure in the previously unstable wheel at its lowest level for longer than necessary. But this is automatically avoided in the flow-valve system, and so the delayed dump of the still-stable wheel is independent of the status of the unstable wheel.

Figure 4:
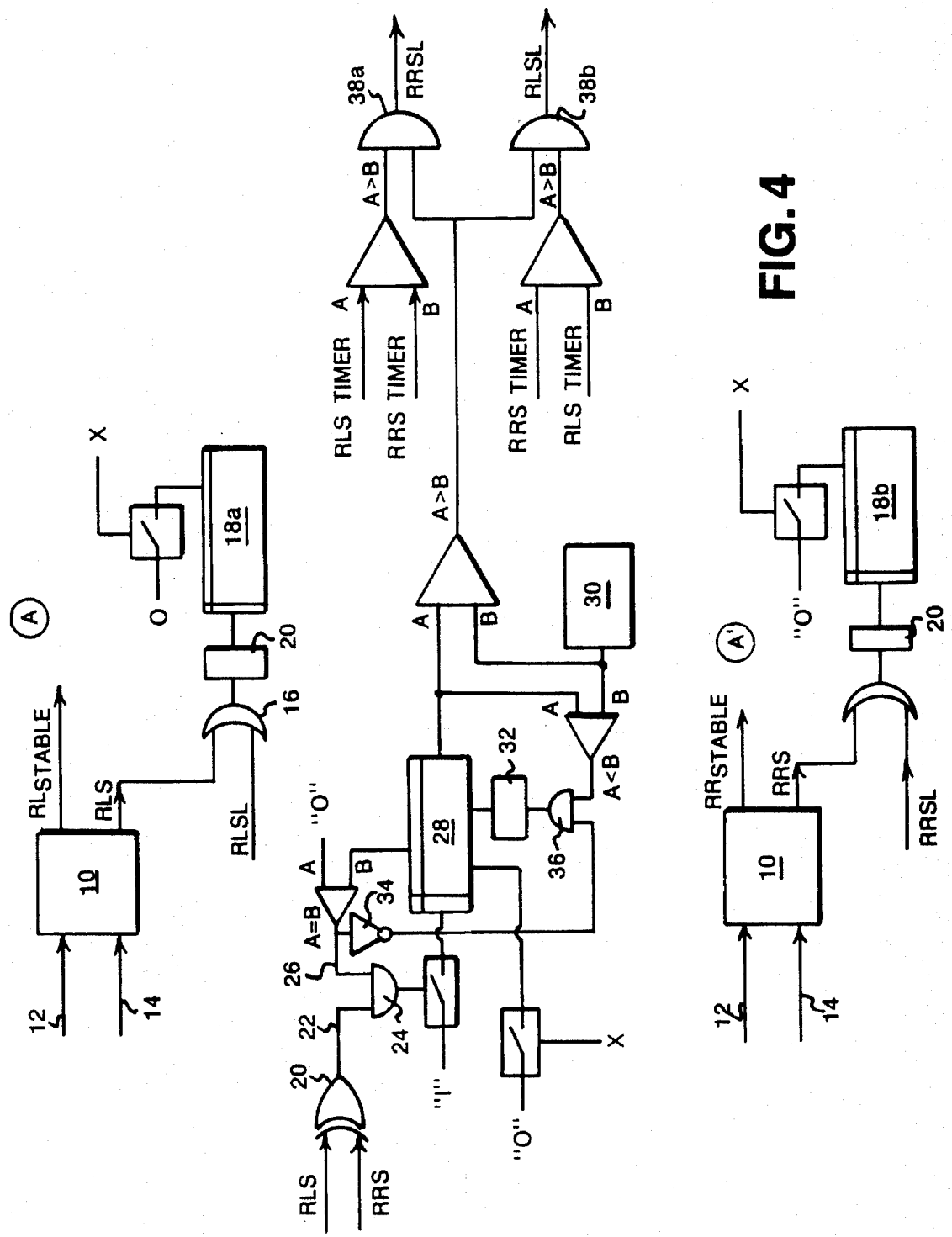
FIGS. 4 and 4a–4d comprise a number of circuit diagrams illustrating possible embodiments of circuitry for use in implementing the present invention.

Referring now to FIG. 4, there is shown one embodiment of circuit hardware for achieving the operation of the present invention as described hereinbefore. The circuit portions A and A' at the top and bottom of FIG. 4 are identical and respectively illustrate the control circuits for the left and right hand sides of the rear axle of a vehicle. Thus, the same circuit configuration is used for each side. Considering the control circuit A for the left-hand side, signals representative of the wheel speed and wheel acceleration are fed into an ABS skid detection means 10 by way of lines 12 and 14. The skid detection means 10 provides a first signal $RL_{STABLE}$ which indicates whether the left hand rear wheel is in either a stable (TRUE) or unstable (FALSE) condition. A second signal RLS is provided that is TRUE if the Left Hand dump solenoid has been actuated in order to correct a skid. The RLS signal is fed into one input of an OR gate 16, along with a signal RLSL generated by the control system (as described hereinafter) which is known as either a "select low" firing signal or a "co-controlled firing signal". If either of these signals RLS or RLSL is present at the OR gate 16, an RLS TIMER 18 is started, by way of an incrementer 20, this timer 18 providing the aggregate dump time for the side of the axle under consideration. Therefore, with the timers 18 from both circuits A and A' being available, the aggregate dump time of the rear wheel opposite that under consideration is also available. The RLS TIMER 18 is reset to zero by a signal X, derived from the circuit section shown in FIG. 4b, which is generated by the circuit of FIG. 4b when both rear wheels are stable and the timers for both sides are equal.

The central part of the circuitry of FIG. 4 illustrates the production of the "select low" or "co-controlled" signal RLSL or RRSL that is used to fire the dump solenoid of the wheel not at impending lock after a prescribed period, for a period equal to the aggregate dump time of the wheel under control. The solenoid activities RLS and RRS are monitored by an EXCLUSIVE OR (XOR) gate 20, which provides a TRUE output if either one, but not both inputs, are TRUE. This TRUE output on line 22 is ANDed in an AND gate 24 with a ZERO OFFSET TIMER SIGNAL on a line 26 such that if the value held by an OFFSET TIMER store 28 is zero and is less (which it will be) than a PRESCRIBED PERIOD supplied by an element 30, a "1" is loaded into the TIMER 28 and the TIMER is therefore INCremented by an incrementer 32. The INC control is started after the "1" value has been loaded through an inversion by an inverter 34 at the OFFSET TIMER SIGNAL ANDed in an AND gate 36 with the PRESCRIBED PERIOD comparison. The TIMER 28 is reset to zero by the signal "X" mentioned hereinbefore. The OFFSET TIMER value is compared with the PRESCRIBED PERIOD (this includes the possibility that the period may be fixed or may be adapted, for example, in accordance with vehicle speed and/or vehicle deceleration surface friction), and if the OFFSET TIMER value (which is representative of the lag time between the firing of the controlled dump signal and the firing of the co-controlled dump signal) is greater than or equal to the PRESCRIBED PERIOD, a TRUE signal is applied to one input of each of two AND gates 38a, 38b that generate the co-controlling signals RRSL and RLSL. The other inputs to each of the AND gates 38a, 38b is a signal derived from the two aggregate dump timers 18a, 18b. If on the (left-hand) LH side the RLS TIMER signal is greater than that of the RRS TIMER, this would indicate that the (left-hand) LH side solenoid has been dumped since the aggregate dump time for that side is greater. This would produce a signal RRSL for the right-hand RH side, causing the solenoid at the RH side to dump and begin incrementing its own RRS timer 18b. This dump would occur in-spite of the existence of the STABLE signal or $RR_{STABLE}$ signal being TRUE. When the RRS timer 18b for the right-hand side has incremented to a value equal to the RLS timer value, and assuming that the activity on the originally unstable side has ceased, the inputs to the AND gate 40 in FIG. 4b will all be TRUE, thereby producing a TRUE value of "X" and so resetting both the OFFSET TIMER 28 and each of the Aggregate Dump Time Timers 18a, 18b.

Figure 4A:
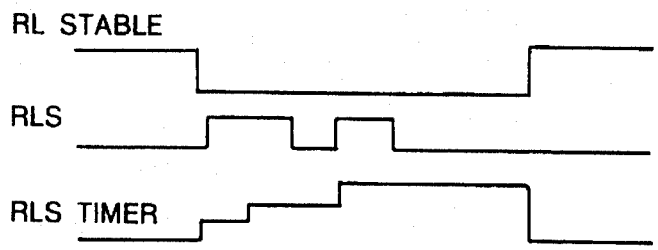
Figure 4B:
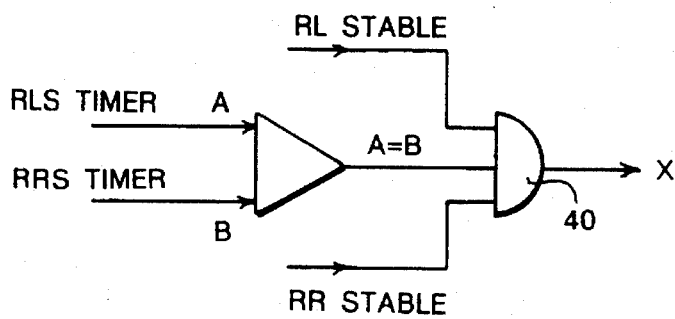
Figure 4C:
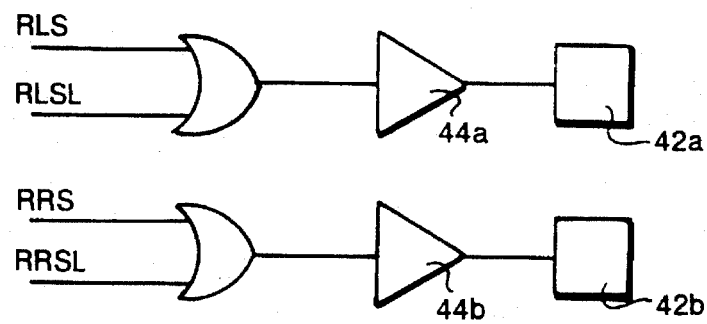

The circuit section shown in FIG. 4c represents the final output stage of the control whereby if either a TRUE dump signal (RLS or RRS) or a SELECT LOW/CO-CONTROLLED FIRING SIGNAL (RLSL or RRSL) signal is present on the appropriate rear wheel control, the dump solenoid 42a, 42b for that brake will be fired via a respective solenoid driver 44a, 44b and the brake pressure dumped.

FIG. 4a illustrates how the RLS TIMER 18a is incremented during the time that the $RL_{STABLE}$ signal is present and the RLS signal is TRUE.

Figure 4D:
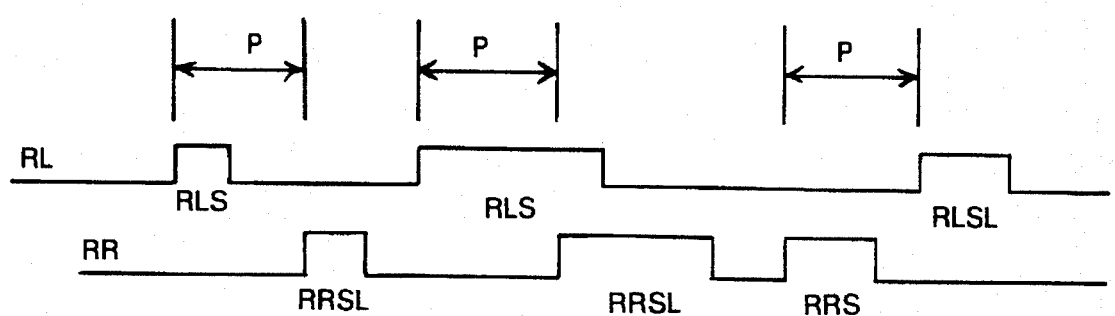

Finally, FIG. 4d shows an example of the production and interaction of the RLS, RLSL, RRS and RRSL pulses for the right and left hand channels in a typical situation. It will be noted that the PRESCRIBED PERIOD (P) exists between the initiation of a first RLS pulse on the R1 channel and the initiation of a first RRSL pulse of the RH channel and the PRESCRIBED PERIOD (P) exists between the initiation of a second RLS pulse of the RL channel and the initiation of a second RRSL pulse on the RH channel. However, the PRESCRIBED PERIOD (P) exists between the initiation of a first RRS pulse on the RH channel and the initiation of an RLSL pulse on the LH channel.

We claim:

1. An anti-lock ABS braking system for a road vehicle having rear wheels which may operate in a stable condition or an unstable condition, comprising:

(a) an electronic controller;

(b) a source of operating pressure;

(c) a respective brake actuator for each rear wheel of the vehicle;

(d) a respective dump valve for each said brake actuator which can be actuated for a dump valve time whose aggregate enables pressure to be selectively dumped from that actuator under the direction of the controller to release the braking action of a rear wheel having a brake actuator including the respective dump valve;

(e) means for establishing that a given rear wheel of the vehicle is operating in a stable condition;

(f) means for establishing an aggregate dump valve time of a rear wheel opposite to the given rear wheel; and (g) means for allowing the brake pressure at the given rear wheel to continue to rise for a prescribed period and to then actuate its dump valve for a period corresponding to the established aggregate dump time of the opposite rear wheel.

* * * * *